US012642374B2

(12) United States Patent
Rollwa et al.

(10) Patent No.: US 12,642,374 B2
(45) Date of Patent: Jun. 2, 2026

(54) BLOCK STORAGE SYSTEM

(71) Applicant: Jungheinrich Aktiengesellschaft, Hamburg (DE)

(72) Inventors: Volker Rollwa, Pirmasens (DE); Jörg Cavelius, Bad Vilbel (DE); Markus Liebhaber, Oberursel (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 478 days.

(21) Appl. No.: 17/703,402

(22) Filed: Mar. 24, 2022

(65) Prior Publication Data

US 2022/0304484 A1 Sep. 29, 2022

(30) Foreign Application Priority Data

Mar. 25, 2021 (EP) .................................... 21164920

(51) Int. Cl.
*A47G 7/04* (2006.01)
*B65G 1/04* (2006.01)
(Continued)

(52) U.S. Cl.
CPC ........... *A47G 7/041* (2013.01); *B65G 1/0492* (2013.01); *A01G 7/045* (2013.01); *B65G 13/00* (2013.01); *B65G 45/10* (2013.01)

(58) Field of Classification Search
CPC .... B65G 1/0492; B65G 1/0464; B65G 13/00; B65G 45/10; B65G 59/02; B65G 65/001; B65G 57/003; B65G 47/04; B65G 47/34; B65G 47/52; B65G 47/642; B65G 47/643; B65G 47/66; B65G 47/74; B65G 47/90; B65G 57/03; B65G 65/00; A01G 7/045; A01G 31/06; A47G 7/041; B62B 2301/044; B62B 2202/02; B62B 3/02; B62B 3/102
USPC ......... 414/796.7, 796.8, 796.6, 796.5, 796.2, 414/795.2, 795.9, 795.6, 792.8, 541, 542, 414/544, 573, 608, 498; 254/133 R, 387
See application file for complete search history.

(56) References Cited

U.S. PATENT DOCUMENTS 4,139,107 A * 2/1979 Ninomiya ............... B66C 1/663
212/319
4,690,601 A 9/1987 Delius et al.
(Continued)

FOREIGN PATENT DOCUMENTS

CN 102483303 5/2012
CN 206462135 9/2017
(Continued)

OTHER PUBLICATIONS

China Office Action conducted in counterpart China Appln. No. 202210298831.6 (Jan. 30, 2026).
(Continued)

*Primary Examiner* — Glenn F Myers
(74) *Attorney, Agent, or Firm* — GREENBLUM & BERNSTEIN, P.L.C.

(57) ABSTRACT

A block storage system with a block storage element, which includes a carrier frame and a load-bearing element, and a vehicle and a method for operating the block storage system. The method includes, via the vehicle, at least one of detaching the load-bearing element from the carrier frame or engaging the load-bearing element with the carrier frame.

5 Claims, 4 Drawing Sheets

(51) Int. Cl.
| | |
|---|---|
| *A01G 7/04* | (2006.01) |
| *B65G 13/00* | (2006.01) |
| *B65G 45/10* | (2006.01) |

(56) References Cited

U.S. PATENT DOCUMENTS

| | | | | |
|---|---|---|---|---|
| 5,096,367 | A * | 3/1992 | Winski | B65G 59/005 |
| | | | | 414/796.8 |
| 5,129,777 | A | 7/1992 | Pohjonen et al. | |
| 5,323,567 | A * | 6/1994 | Nakayama | A01G 9/249 |
| | | | | 47/65 |
| 7,402,018 | B2 * | 7/2008 | Mountz | B60P 1/64 |
| | | | | 280/47.35 |
| 11,807,454 | B2 * | 11/2023 | Rollwa | B66F 9/06 |
| 2012/0159803 | A1 | 6/2012 | Van Veen et al. | |
| 2017/0150688 | A1 | 6/2017 | Wang | |
| 2017/0174431 | A1 * | 6/2017 | Borders | B65G 67/22 |
| 2018/0029796 | A1 | 2/2018 | De Vries | |
| 2018/0362271 | A1 * | 12/2018 | Sun | B65G 47/917 |
| 2020/0339348 | A1 * | 10/2020 | Durai | B65G 65/00 |
| 2021/0395011 | A1 * | 12/2021 | Crawford, Jr. | B60P 1/38 |
| 2022/0081017 | A1 * | 3/2022 | Stranahan | B62B 3/102 |

FOREIGN PATENT DOCUMENTS

| | | |
|---|---|---|
| CN | 107406194 | 11/2017 |
| CN | 210987541 | 7/2020 |
| EP | 0 012 733 | 6/1980 |
| FR | 2754803 | 4/1998 |
| JP | S55-080605 | 6/1980 |
| JP | S61-177931 | 8/1986 |
| JP | 2000-225881 | 8/2000 |
| JP | 3208835 | 2/2017 |

OTHER PUBLICATIONS

Japan Office Action conducted in counterpart Japan Appln. No. 2022-048163 (Feb. 17, 2026).

* cited by examiner

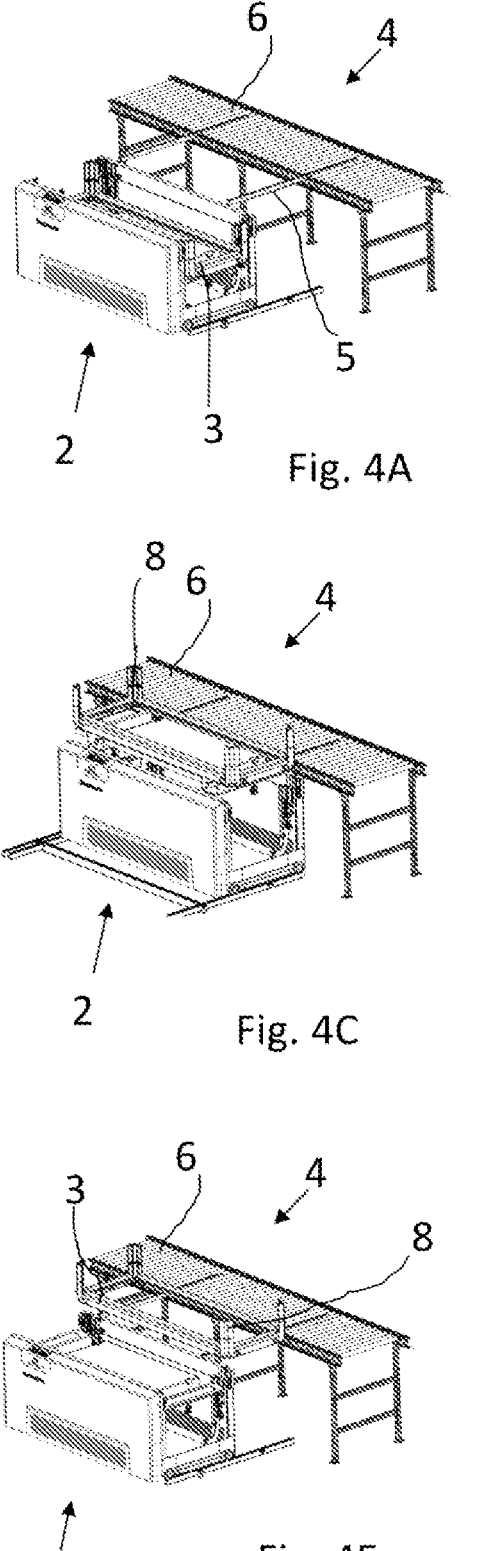
Fig. 4A
Fig. 4C
Fig. 4E
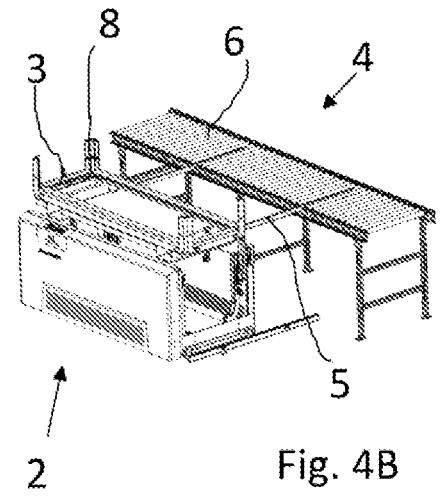
Fig. 4B
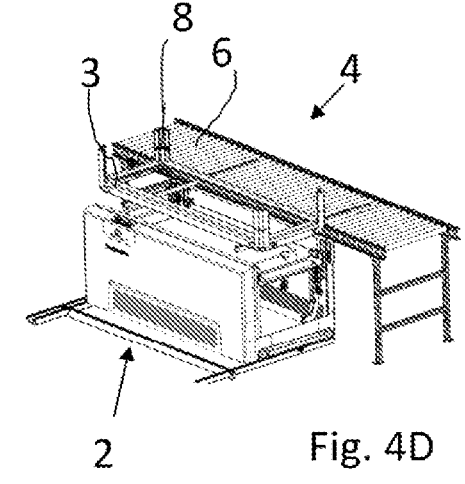
Fig. 4D
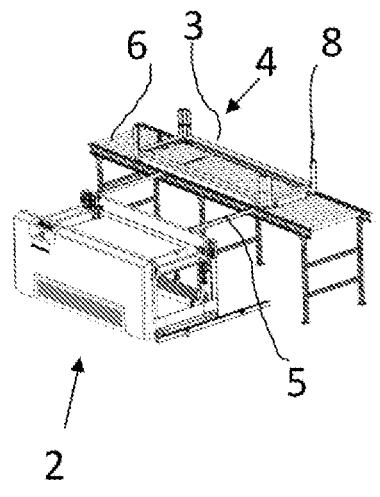
Fig. 4F

BLOCK STORAGE SYSTEM

CROSS-REFERENCE TO RELATED APPLICATION

The present application claims priority under 35 U.S.C. § 119(a) of Europe Patent Application No. 211 64 920.7 filed Mar. 25, 2021, the disclosure of which is expressly incorporated by reference herein in its entirety.

BACKGROUND

1. Field of the Invention

Embodiments of the present invention relate to a method for operating a block storage system with a block storage, a block storage element, and a vehicle. The block storage element has a carrier frame and a load-bearing element. The load-bearing element is detachably engaged with the carrier frame. Embodiments further relate to a block storage system with a block storage, a block storage element, and a vehicle, where the block storage element has a load-bearing element and a carrier frame, and the load-bearing element and the carrier frame are detachably engaged.

2. Discussion of Background Information

Known block storage systems, for example known from EP 0 012 733 131, describe carrier frames upon which a pallet is placed. The carrier frame, with or without pallet, is removably stocked in a block storage.

A block storage describes a storage system with at least one block element receiving room. Stackable block storage elements can be stored in and retrieved from the block storage element receiving room. For this purpose, at least one block storage element is stored in or retrieved from the block storage element receiving room through a loading room. The loading room can be arranged above or below the block storage element receiving room in the direction of gravity, so that a storage or retrieval direction is oriented in or against the direction of gravity. The stocking or retrieval direction is established by the arrangement of the loading room. If the loading room is arranged above the block storage element receiving room, the stocking direction is oriented in the direction of gravity, and the retrieval direction against the direction of gravity. If the loading room is arranged below the block storage element receiving room in the direction of gravity, the stocking direction is oriented against the direction of gravity, and the retrieval direction in the direction of gravity. If several block storage elements are stored in the block storage element receiving room, a block storage element stack comes about. Additional designations for the block storage are stack storage or container stack storage. In the following explanation, the block storage element receiving room is arranged above the loading room in the direction of gravity.

SUMMARY

Embodiments are directed to a system that makes the block storage element easy to handle.

Embodiments are directed to method for operating a block storage system with a block storage, a block storage element, and a vehicle. The block storage element has a carrier frame and a load-bearing element, and the load-bearing element is detachably engaged with the carrier frame. The vehicle detaches the load-bearing element from the carrier frame and/or the vehicle engages the load-bearing element with the carrier frame.

In the method of the kind mentioned at the outset, the vehicle detaches the load-bearing element from the carrier frame and/or the vehicle engages the load-bearing element with the carrier frame. As a result of this arrangement, the vehicle that moves the block storage element also handles the separation of the load-bearing element from the carrier frame. This prevents the block storage element from being transferred from the vehicle to another device, so that a good efficiency is achieved.

The vehicle further interacts with the block storage element, in that the vehicle stocks the block storage element in or retrieves it from the block storage. If the vehicle separates and/or connects the load-bearing element and the carrier frame, the vehicle takes over an additional task, thereby increasing vehicle utilization.

The vehicle preferably detaches the load-bearing element from the carrier frame, and transfers the load-bearing element to a conveying device, wherein the carrier frame remains on the vehicle. As a result, the carrier frame can be stocked in a buffer or in the block storage by the vehicle. By contrast, the load-bearing element can be intralogistically processed by the conveying device, for example. Therefore, no other system is required for transferring the load-bearing element. This reduces costs and leads to a good efficiency.

The conveying device preferably moves and/or cleans the load-bearing element and/or the carrier frame independently of each other. To this end, the carrier frame can be transferred to the conveying device, for example. Because the load-bearing element and/or the carrier element are cleaned independently of each other, attention can be paid to a respective requirement. For example, the carrier frame can have an electronic device, which can no longer be allowed to come into contact with liquid. This is contrasted against a load-bearing element, which must be cleaned with chemicals and a corresponding liquid, for example. Separating the cleaning of the load-bearing element from the cleaning of the carrier frame prevents a cleaning-induced failure of the load-bearing element or the carrier frame. This keeps the maintenance outlay low.

For example, because the carrier frame is moved independently of the load-bearing element, the flexibility of the block storage system is further increased. The carrier frame is thus not bound to an individual load-bearing element, but can rather interact with different load-bearing elements that can be varyingly configured. As a result, various stored goods can continue to be stored in the block storage. This leads to a good flexibility.

The carrier frame preferably has an upper stack geometry and a lower stack geometry, wherein a first carrier frame is arranged above a second carrier frame in the block storage, and an upper stack geometry of the second carrier frame is detachably engaged with a lower stack geometry of the first carrier frame. The stack geometries form a stable block storage element stack. The block storage element stack has at least two carrier frames and/or block storage elements arranged one above the other.

In addition, the stack geometries space load-bearing elements in a block storage element stack apart from each other, so that sensitive stored goods can also be stored.

Embodiments are directed to block storage system with a block storage, a block storage element, and a vehicle. The block storage element has a load-bearing element and a carrier frame, and the load-bearing element and the carrier frame are detachably engaged. The carrier frame and the load-bearing element can be separated and merged by the vehicle.

For this purpose, the carrier frame and the load-bearing element can be separated and merged in a block storage system of the kind mentioned at the outset. This eliminates the need for additional handling devices for separating and merging the load-bearing element and carrier frame, for example such as forklifts. This not only reduces the use of additional equipment, but also keeps costs down.

The load-bearing element preferably has a plant receiving area. For example, seedlings, plants, mushrooms, or the like can be arranged in the plant receiving area. As a result, for example, the load-bearing element can be used in a block storage designed like a greenhouse. In addition, a load-bearing element with a plant receptacle eliminates the need to repot the plants as soon as they are ready for delivery. For example, a salad grown in a load-bearing element can enter the market in this load-bearing element, so that the salad gets to the consumer fresh and crispy. This not only yields a good freshness for the plants, but also economizes on handling steps.

The load-bearing element preferably has a liquid and/or nutrient supply. The liquid and/or nutrient supply is also referred to as liquid supply, wherein the term liquid also includes nutrient solutions. The liquid supply can be used to supply plants with liquid, for example, so that the plants encounter an optimal growth environment. For example, the load-bearing element can resultantly be used in greenhouse systems. This enables a broad range of applications for the load-bearing element.

The carrier frame preferably has a lighting system. The lighting system makes it possible to illuminate a load-bearing element, for example which is arranged under the lighting system. For example, the carrier frame can thus be used in a greenhouse system or a technical storage for illumination, heating, warming, or the like. This leads to a good flexibility of the carrier frame.

The carrier frame preferably has at least one upper stack geometry and one lower stack geometry, wherein a first block storage element in the block storage is arranged above a second block storage element in the direction of gravity, wherein a lower stack geometry of the carrier frame of the first block storage element is detachably engaged with an upper stack geometry of the carrier frame of the second block storage element. In the block storage, the stack geometries thus space the load-bearing element of the first block storage element apart from the load-bearing element of the second block storage element. As a result, pressure-sensitive stored goods can also be stored in the block storage. Pressure-sensitive stored goods include plants, for example. This expands the range of applications and storage capabilities of the block storage, and results in a good flexibility of the block storage.

The vehicle preferably has a hoisting device for separating and merging the load-bearing element and the carrier frame. For example, if a carrier frame with a load-bearing element is arranged on the vehicle, the vehicle can separate the load-bearing element from the carrier frame by way of the hoisting device. To this end, the vehicle spaces the load-bearing element apart from the carrier frame. There is thus no need for any other peripheral to separate the load-bearing element from the carrier frame. As a result, costs are kept down.

The hoisting device is preferably a first hoisting device, wherein the vehicle has a second hoisting device that interacts with the carrier frame. For example, the second hoisting device makes it possible to stock the carrier frame with or without a load-bearing element in and/or retrieve it from the block storage. A good range of applications is achieved for the vehicle as a result.

The load-bearing element and/or the carrier frame can preferably be moved independently of each other by a conveying device in a separated arrangement, in which the carrier frame is separated from the load-bearing element. As a result, the carrier frame can be engaged with different load-bearing elements. A loadbearing element can also interact with different carrier frames. This leads to a good flexibility for the load-bearing element and carrier frame.

The conveying device preferably has a cleaning device. The cleaning device can here clean both the load-bearing element and/or the carrier frame. As a result, a good cleanliness and hygiene are achieved for the block storage system.

Embodiments are directed to a method for operating a block storage system with a block storage element, which includes a carrier frame and a load-bearing element, and a vehicle. The method includes, via the vehicle, at least one of detaching the load-bearing element from the carrier frame or engaging the load-bearing element with the carrier frame.

In accordance with embodiments, after detaching the load-bearing element from the carrier frame, the method can further include transferring the load-bearing element to a conveying device, while the carrier frame remains on the vehicle.

According to embodiments, the conveying device may be configured to at least one of move or clean at least one of the load-bearing element or the carrier frame. Further, the load-hearing element and the carrier frame can be at least one moved or cleaned by the conveying device independently of each other.

In other embodiments, the block storage system may further include at least one second carrier frame, and the carrier frame and the at least one second carrier frame may each have an upper stack geometry and a lower stack geometry. The carrier frame can be positionably arranged above the second carrier frame in a block storage, so that the upper stack geometry of the at least one second carrier frame can be detachably engaged with the lower stack geometry of the first carrier frame.

Embodiments are directed to a block storage system that includes a block storage element having a load-bearing element and a carrier frame; and a vehicle. The load-bearing element and the carrier frame are detachably engagable with each other, and the carrier frame and the load-bearing element are separatable from each other and mergeable together by the vehicle.

According to embodiments, the load-bearing element can have a plant receiving area.

In other embodiments, the load-bearing element may have at least one of a liquid or nutrient supply.

In accordance with other embodiments, the carrier frame may have a lighting system.

According to still other embodiments, the block storage system can further include at least one second block storage element that includes a second carrier frame, and the carrier frame and the second carrier frame can each have an upper stack geometry and a lower stack geometry. In a block storage, the block storage element can be arranged above the second block storage element in the direction of gravity, such that the lower stack geometry of the carrier frame is detachably engaged with the upper stack geometry of the second carrier frame.

In embodiments, the vehicle may have a hoisting device for separating and merging the load-bearing element and the carrier frame.

In accordance with other embodiments, the hoisting device may include a first hoisting device, and the vehicle can further have a second hoisting device that interacts with the carrier frame.

According to other embodiments, the block storage system can further include a conveying device, in which at least one of the load-bearing element or the carrier frame are movable independently of each other by the conveying device in a separated arrangement, in which the carrier frame is separated from the load-bearing element.

In accordance with still yet other embodiments, the conveying device can have a cleaning device.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 4A-4F schematically illustrate a transfer of a carrier frame from the vehicle to a conveying device.

DETAILED DESCRIPTION

Figure 1A:
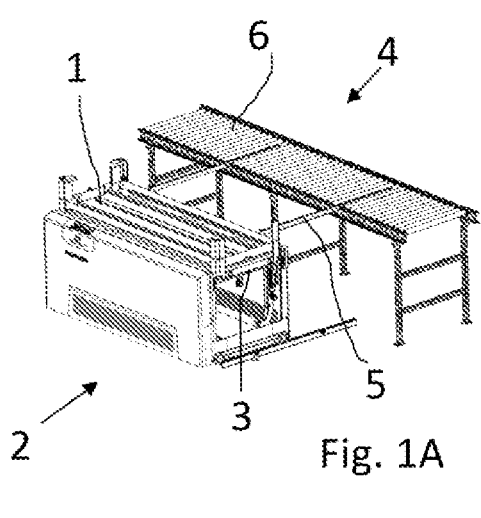
FIGS. 1A-1F schematically illustrate a transfer of a load-bearing element from a vehicle to a conveying device.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIGS. 1A to 1F show a transfer of a load-bearing element 1 to a conveying device 4 proceeding from a vehicle 2 with a carrier frame 3. To this end, the vehicle 2 with a block storage element comprised of the carrier frame 3 and the load-bearing element 1 approaches the conveying device 4. The conveying device 4 has a cross conveyor 5 with two arms, which lead to a longitudinal conveyor 6. Both the cross conveyor 5 and the longitudinal conveyor 6 comprise part of the conveying device 4.

In FIG. 1A, the vehicle 2 complete with the block storage element has approached the conveying device 4. In transferring the load-bearing element 1 from the carrier frame 3 to the conveying device 4, the block storage element is initially lifted in vehicle 2. In this regard, vehicle 2 can include a lifting mechanism for lifting/lowering the block storage element in vehicle 2. Such a lifting mechanism can be located, e.g., in the corners of vehicle 2 or along the closed lateral sides of vehicle 2, and can be formed by, e.g., pneumatic or hydraulic cylinder drives, electric drives, chain drives or other suitable drives for lifting/lowering load-bearing element 1 or carrier frame 3.

Figure 1B:
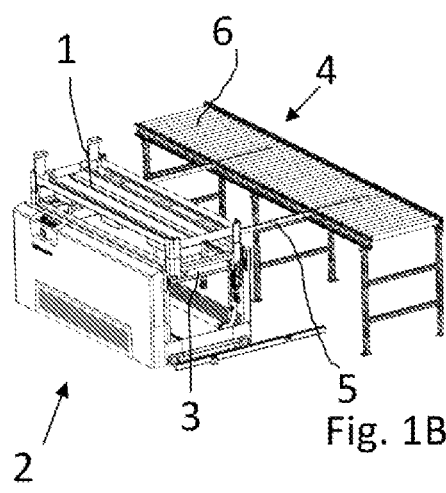

As shown in FIG. 1B, the load-bearing element 1 is separated from the carrier frame 3. To this end, the load-bearing element 1 is lifted by a first hoisting device 7 (see FIGS. 2 and 3) located on the vehicle 2, so as to separate the load-bearing element 1 from the carrier frame 3.

Figure 1C:
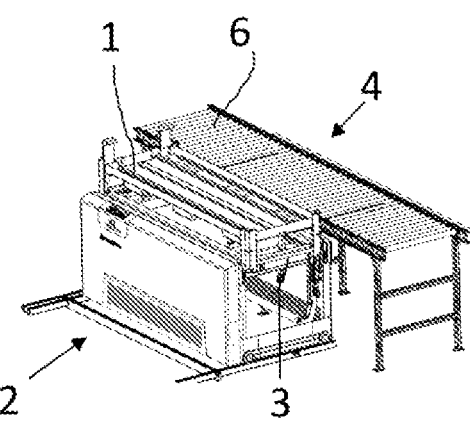

As shown in FIG. 1C, the vehicle 2 has traveled toward the longitudinal conveyor 6 with load-bearing element 1 separated from the carrier frame 3. In this manner, cross conveyor 5 is located between the load-bearing element 1 and the carrier frame 3.

Figure 1D:
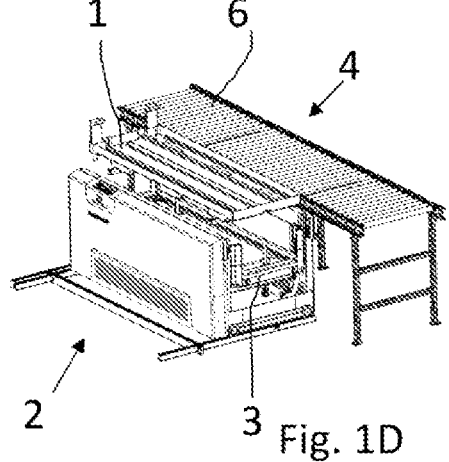

As shown in FIG. 1D, the vehicle 2 lowers the carrier frame 3, so that the load-bearing element 1 remains behind on the cross conveyor 5.

Figure 1E:
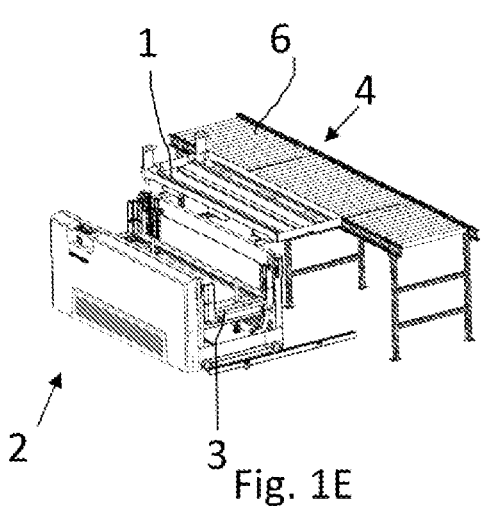

The vehicle 2 complete with carrier frame 3 then drives out from under cross conveyor 5, as shown in FIG. 1E.

Figure 1F:
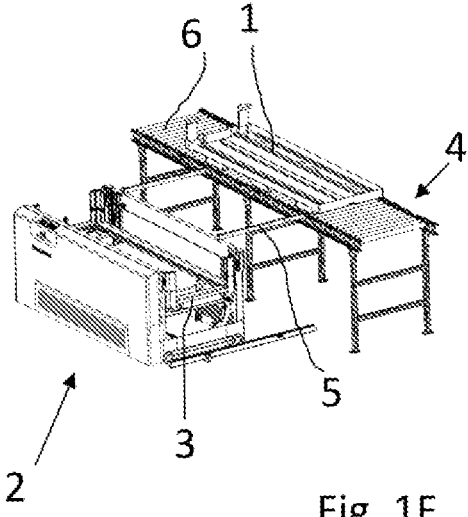

The cross conveyor 5 transfers the load-bearing element 1 to the longitudinal conveyor 6, and can now be moved by the conveying device 4. This is shown in FIG. 1F.

The process takes place in the reverse sequence for positioning a load-bearing element 1 on a carrier frame 3.

Figures 2, 3:
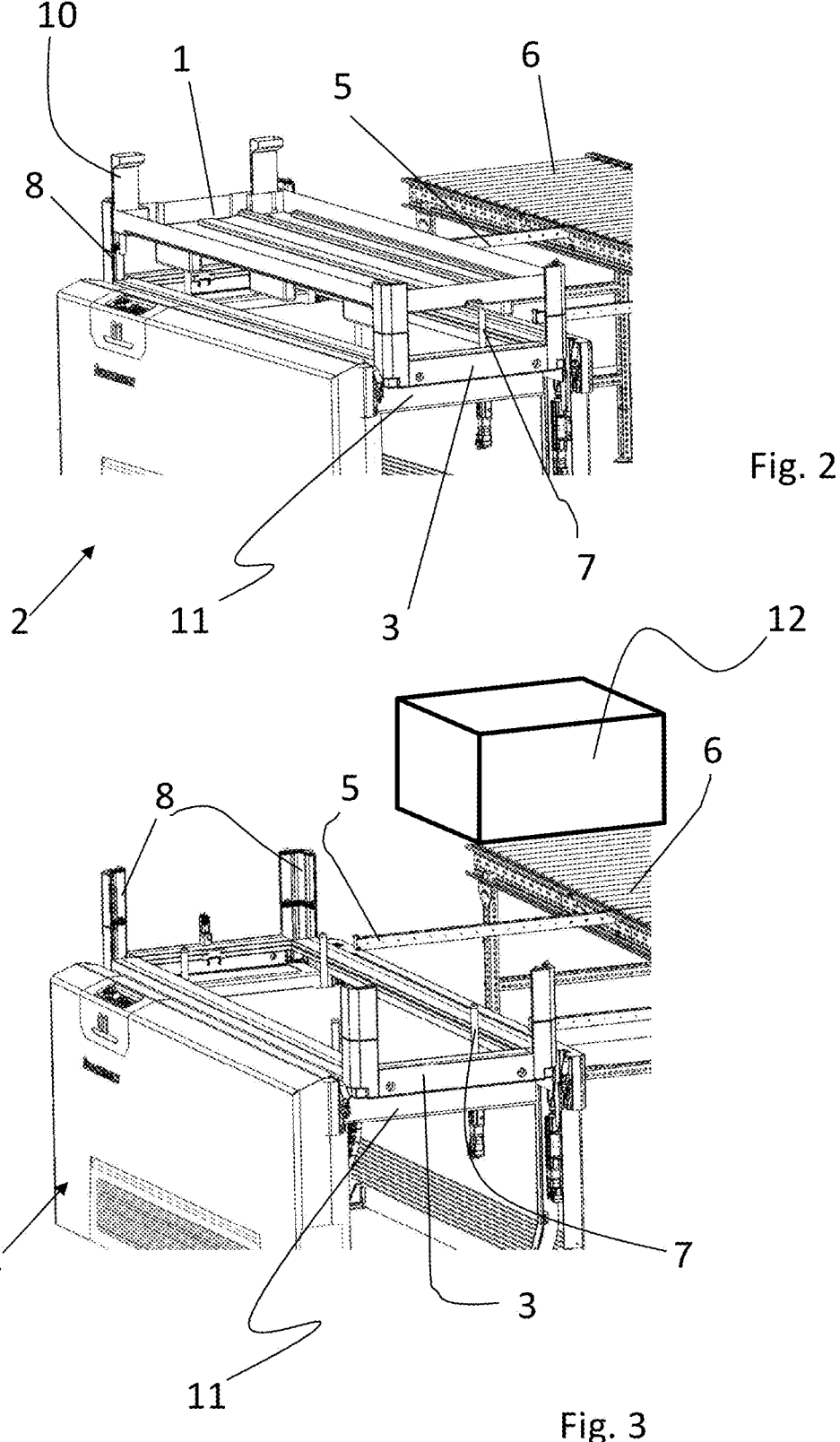
FIG. 2 schematically illustrates a load-bearing element separated from the carrier frame on a vehicle.
FIG. 3 schematically illustrates a vehicle with a carrier frame.

FIG. 2 shows a detail view of the load-bearing element 1 separated from the carrier frame 3. The load-bearing element 1 is here separated from the carrier frame 3 by a first hoisting device 7.

FIG. 3 shows the vehicle 2 with a carrier frame 3. The first hoisting device 7 can be designed as a pneumatic or hydraulic cylinder drive, but it is understood that first hoisting device 7 can also be designed using an electric drive or other suitable drive for lifting load-bearing element 1.

FIGS. 4A to 4F show a process of transferring the carrier frame 3 from the vehicle 2 to the conveying device 4.

To this end, the vehicle 2 approaches the conveying device 4, as shown on FIG. 4A.

FIG. 4B shows the carrier frame 3 lifted by the vehicle 2 to a position suitable for the cross conveyor 5 to find space below the carrier frame 3.

FIG. 4C shows the vehicle 2 with lifted carrier frame 3 has approached the longitudinal conveyor 6, and the cross conveyor 5 are positioned or located between the lifted carrier frame 3 and the vehicle 2.

The vehicle 2 then releases the carrier frame 3 by virtue of the vehicle 2 lowering a second hoisting device 11. The second hoisting device 11 here interacts with the carrier frame 3. The second hoisting device 11 can be, e.g., the lifting mechanism for lifting/lowering the block storage element or the carrier element 3 alone in vehicle 2 or the part of such a lifting mechanism. Such a lifting mechanism can be located, e.g., in the corners of vehicle 2 or along the closed lateral sides of vehicle 2. Moreover, by way of non-limiting example, the second hoisting device can use a pneumatic or hydraulic cylinder drive, an electric drive, a chain drive or other suitable drive or mechanism for lifting/lowering carrier frame 3, with or without load-bearing element 1, within and above vehicle 2.

FIG. 4E shows the vehicle 2 driven forward from under cross conveyor 5, which is supporting carrier frame 3. Thus, carrier frame 3 remains behind on the cross conveyor 5.

FIG. 4F shows the carrier frame 3 transferred from the cross conveyor 5 to the longitudinal conveyor 6.

In addition, FIG. 4B to 4F show a carrier frame 3, which has stack geometries 8.

Described below is how the carrier frame 3 is transferred to the vehicle 2 from the conveying device 4. To this end, the carrier frame 3 is first transferred from longitudinal conveyor 6 to the cross conveyor 5. The vehicle 2 drives under carrier frame 3 supported by on cross conveyor 5 and then lifts the carrier frame 3 from the cross conveyor 5 via the second hoisting device. The vehicle 2, with lifted carrier frame 3, then drives away from cross conveyor 5, so that carrier frame 3 can be lowered by the second hoisting device to be located on vehicle 2.

After vehicle 2 has received a carrier frame 3, it can now receive a load-bearing element 1. To this end, a load-bearing element 1 is transferred from longitudinal conveyor 6 onto the cross conveyor 5 or another cross conveyor. The vehicle 2 drives under the cross conveyor 5, so that it is suitably positioned for receiving the load-bearing element 1. The second hoisting device then moves the carrier frame 3 in such a way that the carrier frame 3 is positioned under the cross conveyor 5, and the first hoisting device 7 can be actuated or moved to interact with the load-bearing element 1. The first hoisting device 7 is initially activated to lift the load-bearing element 1 from the cross conveyor 5. Once the load-bearing element 1 is lifted from the cross conveyor 5, the vehicle 2 moves away from cross conveyor 5 and, via first hoisting device 7, load-bearing element 1 is lowered onto the carrier frame 3. The carrier frame 3 and the load-bearing element 1 now form the block storage element, which can be further lowered in vehicle 2.

The block storage element can be stocked in a block storage (not shown).

When the block storage element is to be retrieved again, it is removed from the block storage by vehicle 2. The vehicle 2 then moves to the conveying device 4, while the load-bearing element 1 is separated from the carrier frame 3.

To this end, the vehicle 2 lifts the carrier frame 3 together with load-bearing element 1 by way of the second hoisting device. The vehicle 2 subsequently separates the load-bearing element 1 from the carrier frame 3 by way of the first hoisting device 7. This results in a gap between the carrier frame 3 and the load-bearing element 1 into which the cross conveyor 5 can be introduced.

To this end, the vehicle 2 with lifted carrier frame 3 and load-bearing element 1 lifted from carrier frame 3 travels toward conveying device 4, so that the cross conveyor 5 is positioned between the load-bearing element 1 and the carrier frame 3. The load-bearing element 1 is subsequently lowered onto the cross conveyor 5. The carrier frame 3 remains on the vehicle 2, and can be stocked in the block storage or a buffer (not illustrated), for example. As an alternative thereto, the carrier frame 3 can be transferred to conveying device 4.

In order to retrieve the carrier frame 3, carrier frame 3 can be lifted by the second hoisting device on vehicle 2, so that the carrier frame 3 is positioned above the cross conveyor 5 in the direction of gravity.

Then, vehicle 2 can subsequently travel toward conveying device so that cross conveying device 5 is arranged under carrier frame 3, and then lower the carrier frame 3 onto the cross conveyor 5. The cross conveyor 5 can transfer the carrier frame 3 to the longitudinal conveyor 6. From there, the carrier frame 3 can be further moved by the conveying device 4.

Both the carrier frame 3 and the load-bearing element 1 can be transferred to an cleaning device 12 by way of the conveying device 4. The cleaning device 12 can clean the load-bearing element 1 and/or the carrier frame 3 according to its respective needs.

The load-bearing element 1 can further have a plant receiving area, so that the load-bearing element 1 can be placed in a greenhouse system. To this end, the load-bearing element 1 further has a liquid and/or nutrient supply 10. The liquid and/or nutrient supply 10 can be used to supply the load-bearing element 1 and plants located therein with liquid.

The carrier frame 3 can further have a lighting system 9, which radiates downward when the carrier frame 3 is stacked in the block storage. The stack geometries 8, 8' of adjacent carrier frames 3, 3' and/or block storage elements are detachably engaged in the block storage, wherein the carrier frames 3, 3' and/or block storage elements comprise a container stack, as shown in FIG. 5.

Figure 5:
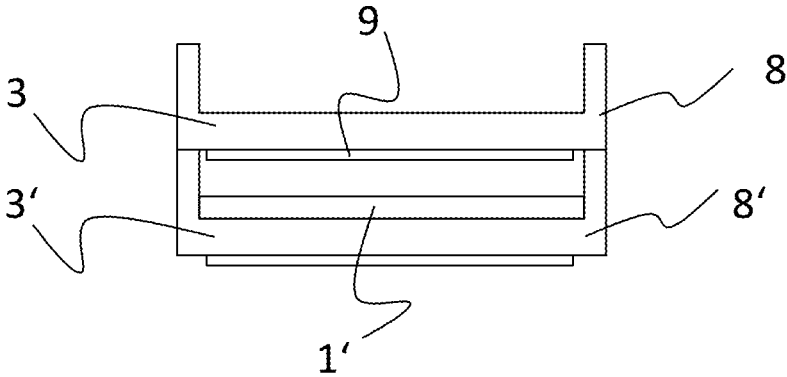
FIG. 5 schematically illustrates a stacked arrangement of carrier frames with a lighting system.

For example, the embodiment illustrated in FIG. 5 shows a first carrier frame 3 is arranged above a second carrier frame 3', in which the lighting system 9 of the first carrier frame 3 illuminates the second carrier frame 32. If a load-bearing element 1' is now arranged on the second carrier frame 3', the load-bearing element 1' is illuminated by the lighting system of the first carrier element 3.

As a result, plants can be grown in the block storage system in any growth stages. The advantage here is that the load-bearing element 1 can be stocked with new seedlings or seeds, wherein the load-bearing element 1 simultaneously also serves as a possible transportation for the sale of grown plants. Therefore, the plants need not be replanted or harvested on site, so that the plants are not exposed to any further stress, and can thus be kept fresh until reaching the end user.

In a plant-related application, the carrier frame 3 can additionally be cleaned independently of the load-bearing element 1, so that attention can be paid to both plant needs and to the requirements of the carrier frame 3, in particular in relation to its associated electronics. This increases ease of maintenance on the one hand, and improves the life of the load-bearing element 1 and the carrier frame 3 on the other.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE LIST

1 Load-bearing element
2 Vehicle
3 Carrier frame
4 Conveying device
5 Cross conveyor
6 Longitudinal conveyor
7 First hoisting device
8 Stack geometries
9 Lighting system
10 Liquid and/or nutrient supply 11 Second hoisting device 12 Cleaning device

What is claimed:

1. A method for operating a block storage system with a block storage element, which includes a carrier frame and a load-bearing element, and a vehicle, wherein the carrier frame is detachably engageable with the vehicle, the method comprising:

at least one of detaching the load-bearing element from the carrier frame or engaging the load-bearing element with the carrier frame via actuation of a hoisting device of the vehicle to vertically move the load-bearing element relative to the carrier frame, wherein, after detaching the load-bearing element from the carrier frame, the method further comprises transferring the load-bearing element to a conveying device, while the carrier frame remains on the vehicle.

2. The method according to claim 1, wherein the conveying device is configured to at least one of move or clean at least one of the load-bearing element or the carrier frame.

3. A method for operating a block storage system with a block storage element, which includes a carrier frame and a load-bearing element, and a vehicle, wherein the carrier frame is detachably engageable with the vehicle, the method comprising:

at least one of detaching the load-bearing element from the carrier frame or engaging the load-bearing element with the carrier frame via actuation of a hoisting device of the vehicle to vertically move the load-bearing element relative to the carrier frame, wherein the conveying device is configured to at least one of move or clean at least one of the load-bearing element or the carrier frame, and wherein the load-bearing element and the carrier frame are at least one of moved or cleaned by the conveying device independently of each other.

4. A method for operating a block storage system with a block storage element, which includes a carrier frame and a load-bearing element, and a vehicle, wherein the carrier frame is detachably engageable with the vehicle, the method comprising:

at least one of detaching the load-bearing element from the carrier frame or engaging the load-bearing element with the carrier frame via actuation of a hoisting device of the vehicle to vertically move the load-bearing element relative to the carrier frame, wherein block storage system further includes at least one second carrier frame, and the carrier frame and the at least one second carrier frame each have an upper stack geometry and a lower stack geometry, wherein the carrier frame is positionably arranged above the second carrier frame in a block storage, so that the upper stack geometry of the at least one second carrier frame is detachably engaged with the lower stack geometry of the first carrier frame.

5. A block storage system comprising:

a block storage element having a load-bearing element and a carrier frame;

a vehicle, wherein the load-bearing element and the carrier frame are detachably engageable with each other, wherein the carrier frame is detachably engageable with the vehicle, and wherein the carrier frame and the load-bearing element are separatable from each other and mergeable together by actuation of a hoisting device of the vehicle to vertically move the load bearing element relative to the carrier frame, and at least one second block storage element that includes a second carrier frame, wherein the carrier frame and the second carrier frame each have an upper stack geometry and a lower stack geometry, and wherein, in a block storage system, the block storage element is arranged above the second block storage element in the direction of gravity, such that the lower stack geometry of the carrier frame is detachably engaged with the upper stack geometry of the second carrier frame.

* * * * *